US007660568B2

(12) United States Patent
Sharma et al.

(10) Patent No.: US 7,660,568 B2
(45) Date of Patent: Feb. 9, 2010

(54) METHOD AND APPARATUS FOR GENERATING A CHANNEL ESTIMATE USING A NON-PILOT PORTION OF A SIGNAL

(75) Inventors: Naresh Sharma, Highland Park, NJ (US); Alexei Ashikhmin, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 851 days.

(21) Appl. No.: 10/950,725

(22) Filed: Sep. 27, 2004

(65) Prior Publication Data
US 2006/0068714 A1    Mar. 30, 2006

(51) Int. Cl.
*H04B 7/00*    (2006.01)
*H04B 1/10*    (2006.01)

(52) U.S. Cl. .................. 455/277.2; 455/226.1; 375/350
(58) Field of Classification Search .................. 455/78, 455/522, 67.11, 130, 63.1, 67.13, 135, 277.2; 370/332, 334, 320, 335, 342, 441; 375/316, 375/350, 147, 148
See application file for complete search history.

(56) References Cited

U.S. PATENT DOCUMENTS

| | | | | |
|---|---|---|---|---|
| 6,307,901 B1 * | 10/2001 | Yu et al. ....................... | 375/341 |
| 6,414,988 B1 * | 7/2002 | Ling ........................... | 375/150 |
| 6,556,541 B1 | 4/2003 | Bare | |
| 6,591,390 B1 * | 7/2003 | Yagyu ......................... | 714/755 |
| 6,594,318 B1 * | 7/2003 | Sindhushayana ............. | 375/341 |
| 6,683,907 B2 * | 1/2004 | Ling ........................... | 375/147 |
| 6,704,299 B1 * | 3/2004 | Li et al. ....................... | 370/332 |
| 6,721,299 B1 * | 4/2004 | Song ........................... | 370/342 |
| 6,763,244 B2 * | 7/2004 | Chen et al. .................. | 455/522 |
| 6,829,313 B1 * | 12/2004 | Xu ............................... | 375/341 |
| 6,888,901 B2 * | 5/2005 | Yu et al. ...................... | 375/341 |
| 6,947,475 B2 * | 9/2005 | Sendonaris et al. ......... | 375/148 |
| 6,996,380 B2 * | 2/2006 | Dent ........................... | 455/101 |
| 7,203,255 B2 * | 4/2007 | Wang et al. ................. | 375/340 |
| 7,340,013 B2 * | 3/2008 | Ammer et al. .............. | 375/340 |
| 7,352,829 B2 * | 4/2008 | Jalloul et al. ................ | 375/340 |

(Continued)

FOREIGN PATENT DOCUMENTS

EP    1 158 708    11/2001

(Continued)

OTHER PUBLICATIONS

H.-Jung Su, E. Geraniotis, Low-Complexity Joint Channel Estimation and Decoding for Pilot Symbol-Assisted Modulation and Multiple Differential Detection Systems With correlated Rayleigh Fading, IEEE Transaction on Communications, vol. 50, No. 2, Feb. 2002.

(Continued)

*Primary Examiner*—Sonny Trinh
(74) *Attorney, Agent, or Firm*—Fletcher Yoder

(57) ABSTRACT

An apparatus and a method for generating a channel estimate using a non-pilot signal. More specifically, there is provided a receiver comprising a device configured to receive a transmitted signal having a pilot portion and non-pilot portion and a channel estimator configured to calculate a channel estimate based on the non-pilot portion of the transmitted signal and to send the channel estimate to the device. A method for implementing the improvement is also provided.

18 Claims, 6 Drawing Sheets

U.S. PATENT DOCUMENTS

| | | | |
|---|---|---|---|
| 7,583,756 B2 * | 9/2009 | Subrahmanya et al. | 375/316 |
| 2001/0017883 A1 * | 8/2001 | Tiirola et al. | 375/148 |
| 2002/0150065 A1 * | 10/2002 | Ponnekanti | 370/334 |
| 2003/0092447 A1 * | 5/2003 | Bottomley et al. | 455/522 |
| 2004/0085917 A1 | 5/2004 | Fitton et al. | |
| 2005/0086570 A1 * | 4/2005 | Ariyoshi | 714/755 |
| 2005/0152478 A1 * | 7/2005 | Jalloul et al. | 375/340 |
| 2009/0080506 A1 * | 3/2009 | Banna et al. | 375/230 |

FOREIGN PATENT DOCUMENTS

| | | |
|---|---|---|
| EP | 1467531 | 10/2004 |

OTHER PUBLICATIONS

M. Valenti, B. Woerner, Iterative Channel Estimation and Decoding of Pilot Symbol Assisted Turbo Codes Over Flat-Fading Channels, IEEE Journal on Selected Areas in Communications, vol. 19, No. 9, Sep. 2001.

1xEV-DV Evaluation Methodology (Proposed V9), 3GPP2-C30-20021209-044R3, Nokia Dec 2002.

C. Berrou, A. Glavieux, and P. Thitimajshima, "Near Shannon limit error-correcting coding and decoding: Turbo-codes," in Proc. ICC'93, pp. 1064-1070.

L. R. Bahl, J. Cocke, F. Jelinek, and J. Raviv, "Optimal decoding of linear codes for minimizing symbol error rate," IEEE Trans, Inform. Theory, vol. 20, pp. 284-287, Mar. 1974.

E. K. Hall and S. G. Wilson, "Design and analysis of turbo codes on Rayleigh fading channels," IEEE J. Select. Areas Commun., vol. 16, pp. 160-174, Feb. 1998.

M. C. Valenti and B. D. Woerner, "Refined channel estimation for coherent detection of turbo codes over flat-fading channels," Electron. Lett., vol. 34, pp. 1648-1649, Aug. 20, 1998.

J. Hagenauer, E. Offer, and L. Papke, "Iterative decoding of binary block and convolutional codes," IEEE Trans. Inform. Theory, vol. 42, pp. 429-445, Mar. 1996.

G. Caire, G. Taricco, and E. Biglieri, "Bit-interleaved coded modulation," IEEE Trans. Inform. Theory, vol. 44, pp. 927-945, May 1998.

A. J. Goldsmith and P. P. Varaiya, "Capacity, mutual information, and coding for finite-state Markov channels," IEEE Trans. Inform. Theory, vol. 42, pp. 868-886, May 1996.

J.K. Cavers, An analysis of pilot symbol assisted modulation for Rayleigh fading channels, IEEE Trans. Veh. Technol., vol. 40, pp. 686-693, Nov. 1991.

C. Komninakis and R. D. Wesel, "Joint iterative channel estimation and decoding in flat correlated Rayleigh fading," IEEE J. Select. Areas Commun., vol. 19, pp. 1706-1717, Sep. 2001.

* cited by examiner

METHOD AND APPARATUS FOR GENERATING A CHANNEL ESTIMATE USING A NON-PILOT PORTION OF A SIGNAL

BACKGROUND OF THE INVENTION

1. Field of the Invention

The present invention relates generally to telecommunications and, more particularly, to wireless telecommunication systems.

2. Description of the Related Art

This section is intended to introduce the reader to various aspects of art that may be related to various aspects of the present invention, which are described and claimed below. This discussion is believed to be helpful in providing the reader with background information to facilitate a better understanding of the various aspects of the present invention. Accordingly, it should be understood that these statements are to be read in this light, and not as admissions of prior art.

Although the first mobile telephone system for public use was developed in 1946, and improved in 1965, modern wireless technology was introduced in 1970 as the Advanced Mobile Phone Service (AMPS), which is the American analog cellular standard. Despite this early development, the first commercial cellular system began operating in Chicago in 1983, thus giving rise to one of the fastest growing consumer technologies in history. Indeed, so many people subscribed to cellular service by the mid-1990s that the critical problem for cellular carriers became that of capacity. Accordingly, cellular providers had to develop ways to derive more capacity. The most extreme and costly method to increase capacity involved reducing cell sizes and introducing additional base stations. However, in many large metropolitan areas, it became increasingly difficult and costly to obtain permits to erect base stations and antennas. Accordingly, cellular providers desired a solution for increasing system capacity without requiring more base stations. One proposed solution involved the use of digital technology.

The first all digital systems, Personal Communication Services (PCS), were introduced in the United States in the mid-1990s. PCS is referred to as the second generation wireless service, with the first generation mobile telephone service being the analog service mentioned above. Various digital wireless technologies were developed, including Frequency Division Multiple Access (FDMA), Time Division Multiple Access (TDMA), Code Division Multiple Access (CDMA), and Global System for Mobile Communications (GSM). Because the advent of digital wireless communications greatly increased the capacity of wireless networks, cellular providers had more capacity to sell to eager subscribers.

As described above, there are various digital technologies. In FDMA, every phone call is assigned to a unique frequency. This technology worked well with a sMAIl number of users, but as the number of users grew, there were simply not enough frequencies for each user. One method of overcoming this limitation was the technology known as TDMA. In TDMA, one frequency is further divided into several time slots. Individual phone calls are then assigned to each time slot. In this way, TDMA allows multiple users to share one frequency, thus increasing the number of users at any one time. Unfortunately, TDMA can not provide enough time slots to satisfy the growing demand.

CDMA is one technique that addresses this problem. In a CDMA system, phone calls are no longer divided by frequency or time slot. Rather, all phone calls are transmitted at the same time and at the same frequency. While this method may appear chaotic, each individual phone or mobile device is able to recognize its call by a unique code assigned to that call. This unique code allows many users to share a single frequency while permitting a greater degree of privacy and security than FDMA or TDMA.

As described above, CDMA systems permit many users to share a single frequency. One potential problem of this type of frequency sharing is multi-access interference. Multi-access interference ("MAI") occurs when a particular signal (user A's phone call, for example) is distorted by other signals sharing the same frequency. Typically, the other signals are other phone calls sharing the same frequency. MAI typically manifests itself as noise, which can distort or mask the transmitted signal. This noise can adversely affect call clarity and limit the number of individual phone calls that can share a single frequency.

Because lower power signals generate less MAI, one technique for reducing this MAI (and thus reducing the noise) is to reduce signal power. Unfortunately, reducing signal power is typically difficult because transmission quality is related to signal power, and all other factors being equal, a signal transmitted at a higher power will arrive at a receiver with fewer errors than a signal transmitted at a lower power. More importantly, a signal transmitted with too little power may be overshadowed by noise on the frequency. If parts of user A's phone call can not readily be distinguished from noise, there can be errors in the phone call. These errors in the phone call are typically measured in frame error rate ("FER"). The FER is the ratio of the data (measured in terms of number of frames where a frame consists of a pre-specified number of bits) transmitted with errors to the total data transmitted. High FERs can result in problems with call clarity such as phone call gaps or dropped calls. Because mobile phone users are typically concerned about call clarity, the providers of mobile phone services are hesitant to reduce signal power at the expense of call clarity.

That being said, mobile phone providers are still very interested in techniques for reducing signal power without sacrificing call clarity because lower power signals create less MAI and may permit more mobile phones to share a single frequency. One method of reducing the power of the other signals without sacrificing call clarity is through signal encoding and decoding. Signal encoding is the altering of the characteristics of a signal to make the signal more suitable for transmission. For example, a signal encoder in a transmitter may add error-correction bits to a signal. These error-correction bits are then used by a signal decoder in a receiver to correct errors that may have developed in the encoded signal during transmission. By allowing the receiver to correct errors that might have developed during transmission, the signal encoder and decoder may permit a transmitter to transmit the signal at a lower power without an increase in the FER. In other words, signal encoding and decoding can offset the effects of transmitting at a lower power. Thus, the better the signal encoding and decoding scheme, the lower the power typically needed to transmit the signal.

One encoding/decoding technique, known as turbo coding, has a greater error correction capability than many previously used codes. In fact, the introduction of turbo codes in 1993 was considered as one of the most exciting and important developments in digital communications in many years. By using turbo codes, data can be transmitted within 0.7 dB of the signal to noise ratio (SNR) as dictated by the Shannon limit, which gives the minimum theoretical SNR for error-free transmission. This high level of error correction permits transmitters to transmit signals at a lower power without increasing the FER. For this reason, turbo coding is a primary candidate for adoption in the next generation of cell phone (known as third generation or "3G" cell phones).

The channel is another factor that can increase the signal power needed to maintain an acceptable PER. The channel includes the net effect of environmental factors, such as the weather, the Earth's magnetic fields, terrain variations, structures, or vehicles, on a signal. Mathematically, after removing the high frequency carrier, it can be represented as a complex number multiplied by the original signal plus noise for a frequency non-selective channel where there is only one copy of the transmitted signal that is received. In order to convert the signal back into a voice or other useful data, a receiver may attempt to compensate for these environmental effects by estimating the channel. If a receiver were able to make a perfect estimate of the channel, the receiver would be able to convert the received signal back into an exact copy of the transmitted signal (assuming no other disturbances like noise or multi-path disturbances). Unfortunately, it is virtually impossible to perfectly estimate the channel. Thus, the receiver is typically not able to compensate for all of the net environmental effects and some additional distortion is introduced at the receiver. Typically, a pilot signal is used to estimate the channel, where a pilot signal includes known symbols that the receiver can be use to calculate an estimate of the channel. The pilot signal typically occupies the same frequency as the user's data signal and, hence, contributes to the MAI in the same way.

As with the noise introduced by MAI, one typical way to compensate for the distortion generated by the imperfect channel estimate is to increase the signal and/or pilot power. As described above, however, increasing the signal and/or pilot power is not preferred because it increases MAI, which may affect call clarity and reduce the number of phone calls that can share the same frequency. Thus, a technique for improving the quality of the channel estimation at lower pilot signal power or lower user's data signal power is desirable because call clarity could be maintained and the total signal power (data signal power plus pilot signal power) used to compensate for imperfect channel estimation could be lowered.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
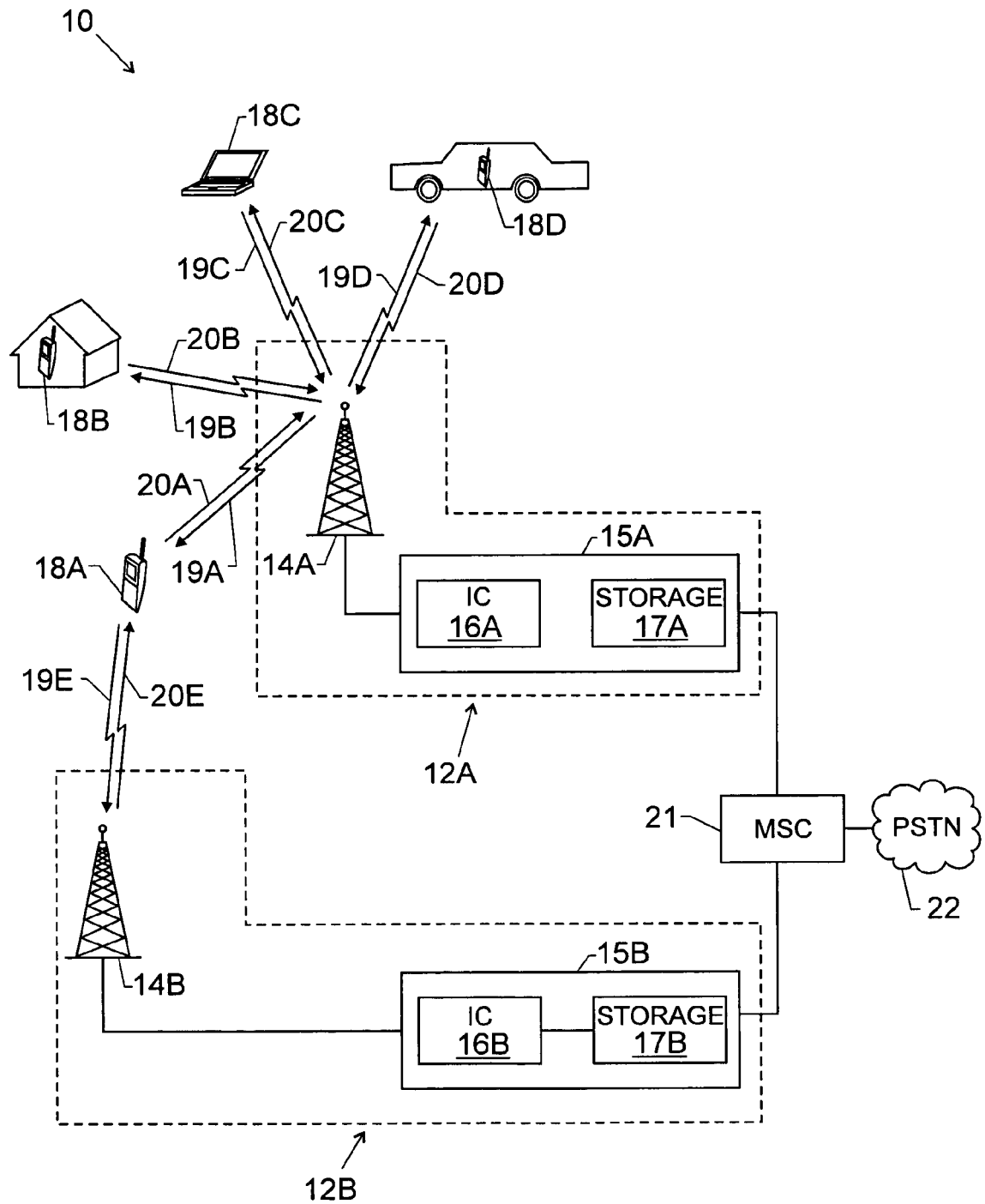
FIG. 1 discloses an exemplary cellular system in accordance with an exemplary embodiment of the present invention.

FIG. 1 depicts an exemplary cellular system 10. The system 10 includes one or more base stations 12A-B. In general, the base stations 12A-B refer to antenna towers 14A-B as well as the cellular communication equipment 15A-B coupled to the antennas 14A-B. The base stations 12A-B are typically stationary base stations, however, in some embodiments they may be truck mounted portable base stations, used for example in emergency situations. The communications equipment 15A-B typically includes integrated circuits (IC) 16A-B. The ICs 16A-B may include application specific integrated circuits (ASICs) or field programmable gate arrays (FPGAs) that execute code to facilitate communications and power control. The ICs 16A-B will typically comprise the transmitters, receivers, or transceivers used by the base stations 12A-B to transmit or receive signals. Each IC 16A-B may further couple to storage media 17A-B. In this manner, the ICs 16A-B may execute instructions or code stored on the storage media 17A-B. The storage media 17A-B may include hard disks, random access memory (RAM), read-only memory (ROM), and electrically programmable read-only memory (EPROM). The code stored on the storage media 17A-B may be partially or totally upgraded by installing new software or reflashing existing memory. It is important to note that the IC 16A-B and the storage media 17A-B may be located on the same computer chip or on the same circuit board. In this case, upgrading the code may take the form of a replacing the computer chip with another computer chip or replacing the circuit board with another circuit board.

The mobile devices 18A-D communicate with the base stations 12A-B and may be, for example, cellular phones located within houses or moving vehicles (e.g., the devices 18B and 18D) or the mobile devices may be cellular circuitry integrated within a computer (e.g., the device 18C). Communication between each mobile device 18A-D and each base station 12A-B includes two portions—the forward links 19A-E and the reverse links 20A-E. As indicated in FIG. 1, the forward links 19A-E refer to communications coming from the base stations 12A-B to the devices 18A-D. Similarly, the reverse links 20A-E refer to communications coming from the mobile devices 18A-D to the base stations 12A-B.

For ease of illustration, only a single signal path is illustrated for each of the forward links 19A-E and the reverse links 20A-E. In reality, however, there may be multiple signal paths between the antenna 32 and the wireless phone $18_a$. As such, it should be understood that the single line illustrating the signal paths 19A-E and 20A-E represents all of the signal paths between the base stations 12A-B and the wireless devices 18A-D. This multi-path phenomenon, also referred to as frequency selective fading, occurs because as the transmitted signal radiates out from the transmitter it may be reflected by physical features or structures, such as buildings. This reflection may create multiple copies of the signal traveling on multiple signal paths between the between the base stations 12A-B and the wireless devices 18A-D. These multiple copies of the signal also may interfere with each other in a CDMA environment thus adding to the noise.

The base stations 12A-B may communicate with a mobile switching center (MSC) 21. In some embodiments, the actual connection between the base stations 12A-B and the MSC 21 may be a T-1 line or microwave connection. The MSC 21 is typically coupled to the public switched telephone network (PSTN) 22. In this manner, the devices 18A-D may communicate with connection to a traditional land line telephone via the combination of the base stations 12A-B, the MSC 21, and the PSTN 22.

Figure 2:
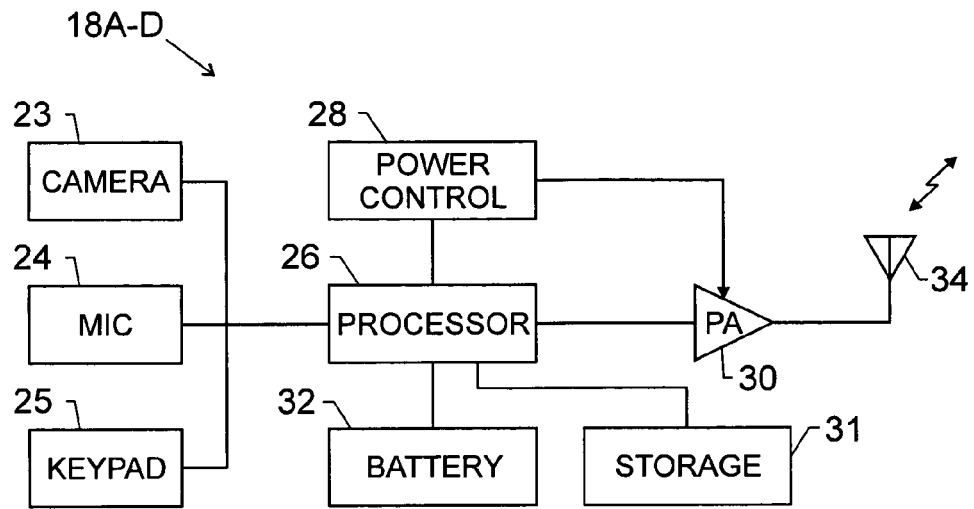
FIG. 2 illustrates a block diagram of an exemplary mobile device in accordance with an exemplary embodiment of the present invention.

FIG. 2 represents an exemplary block diagram of the transceiver of the mobile device 18A-D. A variety of input devices may be coupled to a processor 26. These include, but are not limited to, a camera 23, a microphone 24, and a keypad 25. The processor 26 further couples to a power controller 28, a power amplifier 30, a storage media 31, and a battery 32. The power amplifier 30 couples to an antenna 34 and couples back to the power controller 28. The microphone 24 converts audible voice signals into voltage fluctuations. The processor 26, which may include an analog to digital converter (not shown), may convert the received voltage fluctuation to a digital signal for further processing. Such processing may include encoding the digital signal for transmission according to a particular wireless technology (e.g., CDMA). The processor 26 may also encode digital signals received from the camera 23 or the keypad 25.

The power amplifier 30 amplifies signals from the processor 26 for subsequent transmission via the antenna 34. The power controller 28, which may be included within the processor 26, couples to the power amplifier 30 and controls the power of signals emanating from the antenna 34 by throttling the power level of the power amplifier 30. Controlling the power level in this manner can prolongs the life of the battery 32. The storage media 31 is coupled to the processor 26 and configured to store data received from the camera 23, the microphone 24, or the keypad 25 as well as command instructions for the processor 26.

As stated above, the processor 26 may execute instructions or code stored on the storage media 31. The storage media 31 may include hard disks, random access memory (RAM), read-only memory (ROM), and electrically programmable read-only memory (EPROM). The code stored on the storage media 17A-B may be partially or totally upgraded by installing new software or reflashing existing memory. It is important to note that the processor 26 and the storage media 31 may be located on the same computer chip or on the same circuit board. In this case, upgrading the code may take the form of a replacing the computer chip with another computer chip or replacing the circuit board with another circuit board.

Figure 3:
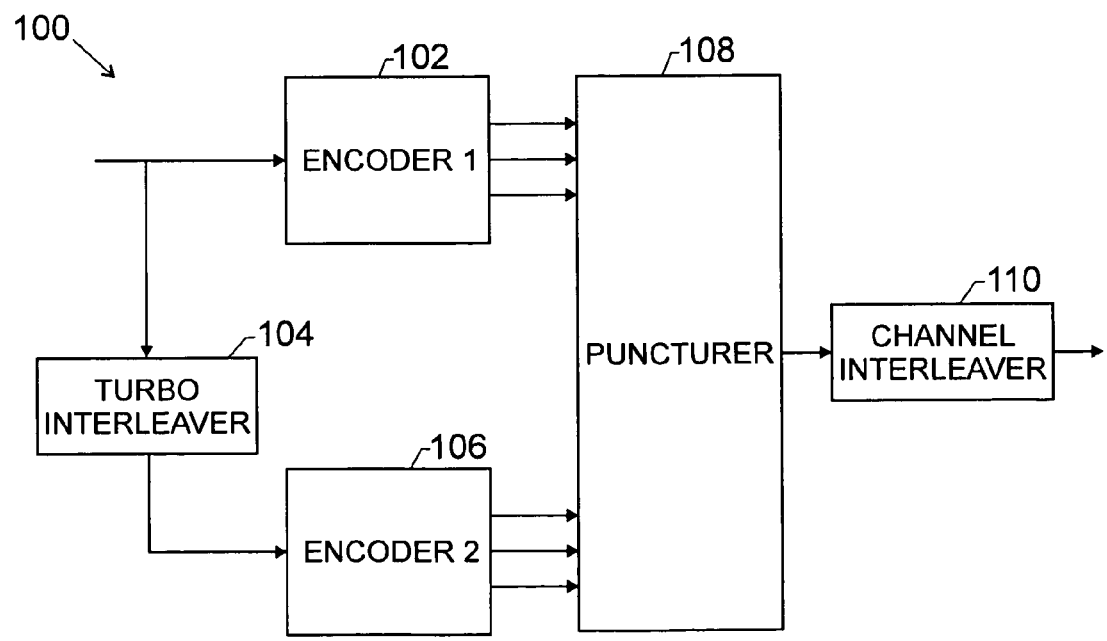
FIG. 3 illustrates a block diagram of a turbo encoder in accordance with an exemplary embodiment of the present invention.

Turning next to FIG. 3, a block diagram of a turbo encoder in accordance with embodiments of the present invention is illustrated and generally referenced by reference numeral 100. The turbo encoder 100 may be employed to encode a digital signal to be transmitted within either the ICs 16A-B or within the processor 26. Turbo codes were first introduced in 1993, and as such the operating principles of the turbo encoder 100 are well-known in the art. Briefly stated, however, the turbo encoder 100 may include two encoders 102 and 106 separated by a turbo interleaver 104, which rearranges the bits within the signal as part of the turbo coding process.

The encoders 102 and 106 typically employ a recursive systematic convolutional ("RSC") code to encode the signal. One way of representing this encoding is as a table that comprises: (1) an input bit, which is the information bit and is also referred to as a systematic bit; (2) a current state, which is an internal variable within the turbo encoder 100; (3) output bits, which are encoded bits and comprised of the systematic bit plus one or more error correction bits, which are known as parity bits; and (4) a new state, which will be the value of the internal variable within the turbo encoder 100 after the systematic bit is encoded (i.e the current state for the next systematic bit to be encoded). The encoding process can essentially be represented by selecting the row of this table corresponding to a particular input bit and current state and then choosing the output (encoded) bits for that row. In one embodiment of the invention, the output bits include one systematic bit and two parity bits.

The turbo encoder 100 may also include a puncturer 108 to increase the code rate above the code rate generated by the encoders 102 and 106. The code rate is the ratio of information bits, referred to as systematic bits, to total transmitted bits (systematic bits plus error correction bits, which are known as parity bits). Typically the code rate of the encoders 102 and 106 is ⅕ or four parity bits for every one systematic bit. The puncturer 108 permits the turbo encoder 100 to reduce the number of error correction bits in the signal and thereby increase the code rate. Even though increasing the code rate may reduce the quality of the decoding because there are less error-correction bits, it will increase transmission rate of systematic bits and thus may increase the amount of information being transmitted over a given period of time.

The turbo encoder 100 may also include a channel interleaver 110. The channel interleaver 110 rearranges the bits within the signal to reduce the chances that a single disturbance along the signal path $20_a$ will result in lost data. When the data in the signal is de-interleaved (i.e. put back in the original order) at the receiver, the effects of a single disturbance will be randomly spread out across the entire signal rather than clustered at the point of the disturbance. This reduces the impact of the disturbance.

After a digital signal has been encoded by the turbo encoder 100, the encoded signal, which is also referred to as the traffic signal, will typically pass to a modulator that will convert the encoded signal into an analog signal for transmission. The modulator may employ a variety of modulation techniques including phase-shift keying ("PSK"), frequency shift keying ("FSK"), and quadrature amplitude modulation ("QAM"), etc. The typical CDMA system will employ a modulator that uses phase-shift keying. In phase-shift keying, the encoded digital bits are converted into an analog signal with a constant amplitude and a phase that varies based on the encoded digital signal. For example, in one form of phase-shift keying known as Quadrature Phase Shift Keying ("QPSK") modulation, there are four different possible phase states. The four different phase states correspond to four different binary combinations: 00, 01, 10, and 11. For this reason, encoded digital bits are transmitted two bits at a time in QPSK modulation. Thus, if the first two bits of the encoded digital signal are 01, the modulator will convert the encoded signal into an analog signal with a phase that has been designated to represent 01. When the analog signal reaches the receiver, the receiver will recognize the phase state and convert the analog signal back into 01. In QAM, both amplitude and phase are changed corresponding to a group of bits.

One important aspect of modulation is the concept of a symbol. A symbol is a "package of bits." Its size is determined by the number of possible states that the phase of the signal can take in a particular modulation scheme. For example, in the QSPK described above, each phase state correlates to two bits (01, for example). Thus in QSPK, the symbol size is two bits. In another form of modulation, known as Eight Phase Shift Keying ("8 SPK"), the phase of the signal can take eight possible states. In binary code, eight possible states translate into 3 bits. Thus, for 8 SPK, a symbol is 3 bits long (101 for example). The symbol is an important structure because the reliability of each of the bits within a particular symbol are linked. An error during the transmission of a symbol may reduce the reliability of every bit within the symbol and vice versa.

Figure 4:
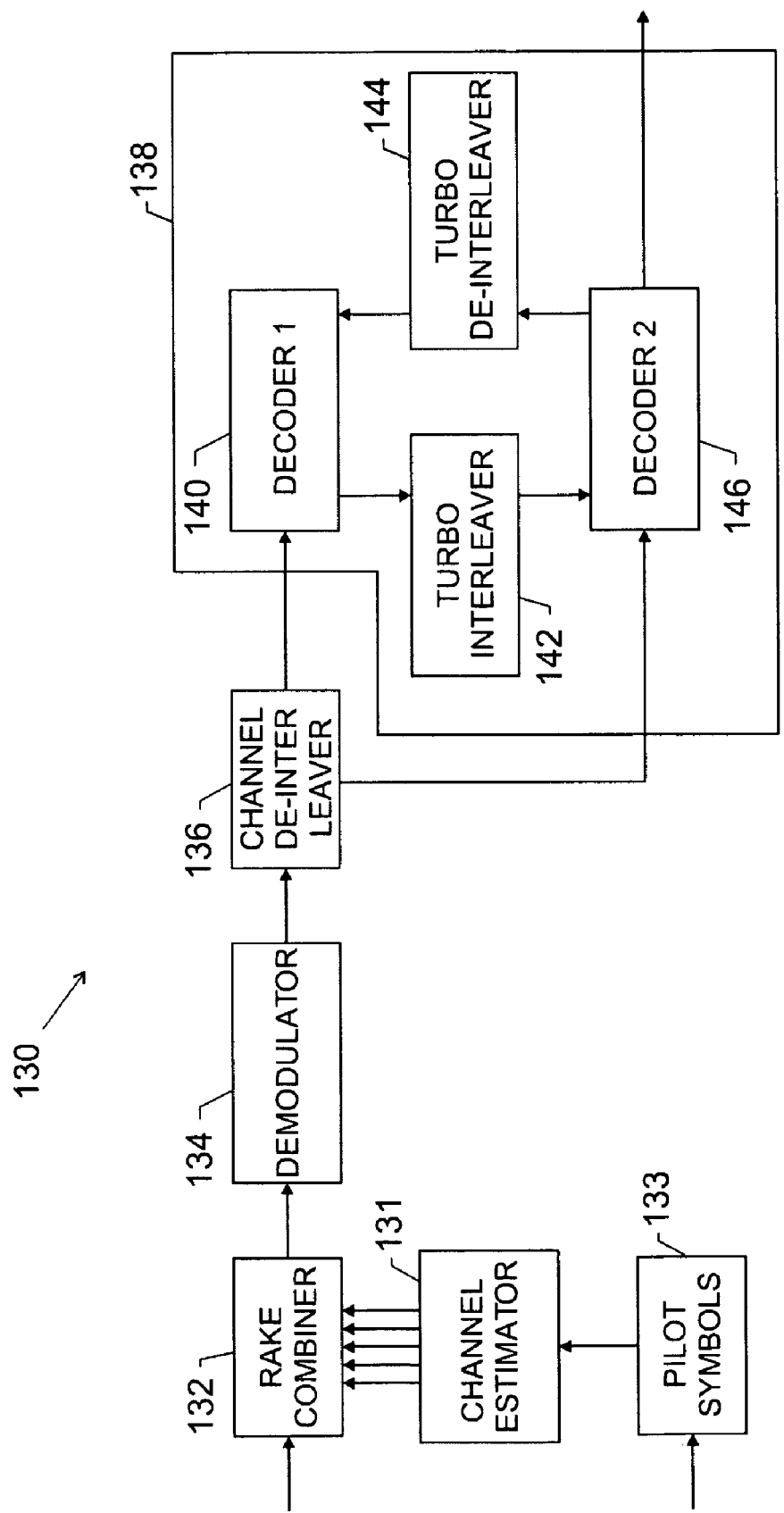
FIG. 4 illustrates a conventional receiver employing a turbo decoder.

Turning next to FIG. 4, a conventional receiver employing a turbo decoder is depicted and generally referenced by the reference numeral 130. One of the first steps in the reception of the traffic signal after removing the high frequency carrier is RAKE combining. As described above, the transmitted signal may be received in multiple copies at the receiver. Because of this, the conventional receiver 130 can produce a better signal by synthesizing the direct and indirect signals together. This is the function of a RAKE combiner 132. In order to perform this synthesis, the RAKE combiner 132 includes several RAKE fingers that each attempt to extract a copy of the transmitted signal out of the multiple copies of the transmitted signal that make up the received signal. The RAKE combiner 132 may then scale the relative weight for each of the multiple copies based on the channel estimate for each RAKE finger that was provided by the channel estimator 131. The RAKE combiner 132 then combines a weighted sum of the signals at the output of each RAKE finger to form a unified replica of the transmitted signal. This unified replica may be in the form of a series of discrete time signals In order to perform these operations accurately, however, the RAKE combiner 132 uses estimates of the channels for each of the multiple copies of the transmitted signal. As described above, the channel is the net effect of environmental factors, such as the weather, the Earth's magnetic fields, terrain variations, structures, or vehicles on the traffic signal. Further, the channel may be different for each copy of the transmitted signal. Due to its complexity, it is typically not possible to know the exact channel between the between the base stations 12A-B and the wireless devices 18A-D, so a channel estimate may be used instead. One common method of determining the channel estimate is with the pilot signal.

The pilot signal is typically comprised of pilot symbols, which are a known set of symbols that are constantly transmitted between the between the base stations 12A-B and the wireless devices 18A-D. Because both the base stations 12A-B and the wireless devices 18A-D know the contents of this pilot signal, the channel estimate can be calculated by comparing the known values of the pilot symbols (i.e. what the pilot symbols should be) with the values of pilot symbols that were actually received. For example, in a QPSK system, if the receiver knows that the pilot symbol is supposed to be 01, it can compare the signal actually received to the analog signal that should have been received for 01 to determine how the channel has affected the transmitted signal during transmission. By performing this comparison enough times, a channel estimator 131 is able to estimate the channel. Of course, because the channel is constantly changing, this process is continuous.

In the conventional receiver 130, the incoming pilot symbols 133 are sent to a channel estimator 131 that performs a channel estimate for each individual RAKE finger based on the pilot symbols. It is important to note that because pilot symbols are known, they are not encoded by the turbo encoder 100 and thus need not be decoded in the receiver 130. The purpose of the pilot signal is not to transmit information, but rather to determine the effect of the channel.

It is important to note that in the conventional receiver 130, the channel estimates for each RAKE finger are typically only calculated once, and that calculation is performed before the RAKE combiner 132 based exclusively on the pilot signal. This technique for channel estimation is referred to as one-shot channel estimation. As will be described in greater detail below, this one-shot channel estimation, while tolerable, still leaves a great amount of room for improvement in the accuracy of the channel estimate.

Returning to FIG. 4, a demodulator 134 calculates soft bits for the series of discrete time signals outputted from the RAKE combiner 132. A soft bit is the logarithm of the ratio of the probability that the bit is equal to one and the probability that the bit is equal to zero. This is called Logarithm of the likelihood ratio ("LLR"). For example, if the soft bits were 0.8 for one and 0.2 for zero, the demodulator 134 would be indicating that there is an 80% chance that the bit is one and a 20% chance that the bit is zero. The LLR for the example above, would be $$\log\left(\frac{0.8}{0.2}\right)$$

or 0.6021 where the logarithm is to the base 10. A positive LLR indicates a greater probability that the soft is supposed to be a one, and a negative LLR indicates a greater possibility the soft bit is supposed to be zero. In an alternate embodiment of the invention, the LLR may be defined as the probability that a bit is zero over the probability that the bit is one. This is merely a matter of convention, and even though this change may require minor adjustments in the techniques described below, these adjustments are well known to those skilled in the art.

After passing through the demodulator 134, the soft bits from the demodulator are routed to a channel de-interleaver 136. The channel de-interleaver 136 is employed to compensate for the effects of the channel interleaver 104 depicted in FIG. 3 and place the soft bits back into their original order.

After the traffic signal has passed through the channel de-interleaver 136, it is routed to a turbo decoder 138. The turbo decoder 138 includes decoders 140 and 146 with a turbo interleaver 142 and a turbo de-interleaver 144 between them. As with the turbo encoder 100, the operation of a turbo decoder 138 is well known in the art. Briefly stated, however, each of the decoders 140 and 146 in the turbo decoder 138 refines the LLR for each systematic bit in the traffic signal. This refining is typically calculated using the soft bits from the channel de-interleaver 136 and a Bahl-Cocke-Jelinek-Raviv ("BCJR") algorithm, but in alternate embodiments, other algorithms may be used. The LLR values for the systematic bits are passed from one decoder to the other through the turbo interleaver 142 and the turbo de-interleaver 144. Each of the decoders 140 and 146 is able to take advantage of the reliability suggestions of the other decoder as it decodes the traffic signal. The decoders 140 and 146 work in an iterative fashion, passing reliability suggestions back and forth for a fixed number of iterations. After the fixed number of iterations, the soft bits, which have been refined in the turbo decoder 138 are converted into hard bits (i.e. one or zeros)

based on their soft bits. For example, the soft bits 0.9 for one and 0.1 for zero would likely be converted into a hard bit one.

It is important to note that the typical turbo decoder does not expend resources to calculate the LLRs for the parity (error-correction) soft bits in each decoding iteration. As such, even though the LLRs for the parity bits are used to refine the LLRs for the systematic bits, the LLRs for the parity bits themselves are typically not refined in each decoding iteration.

Figure 5:
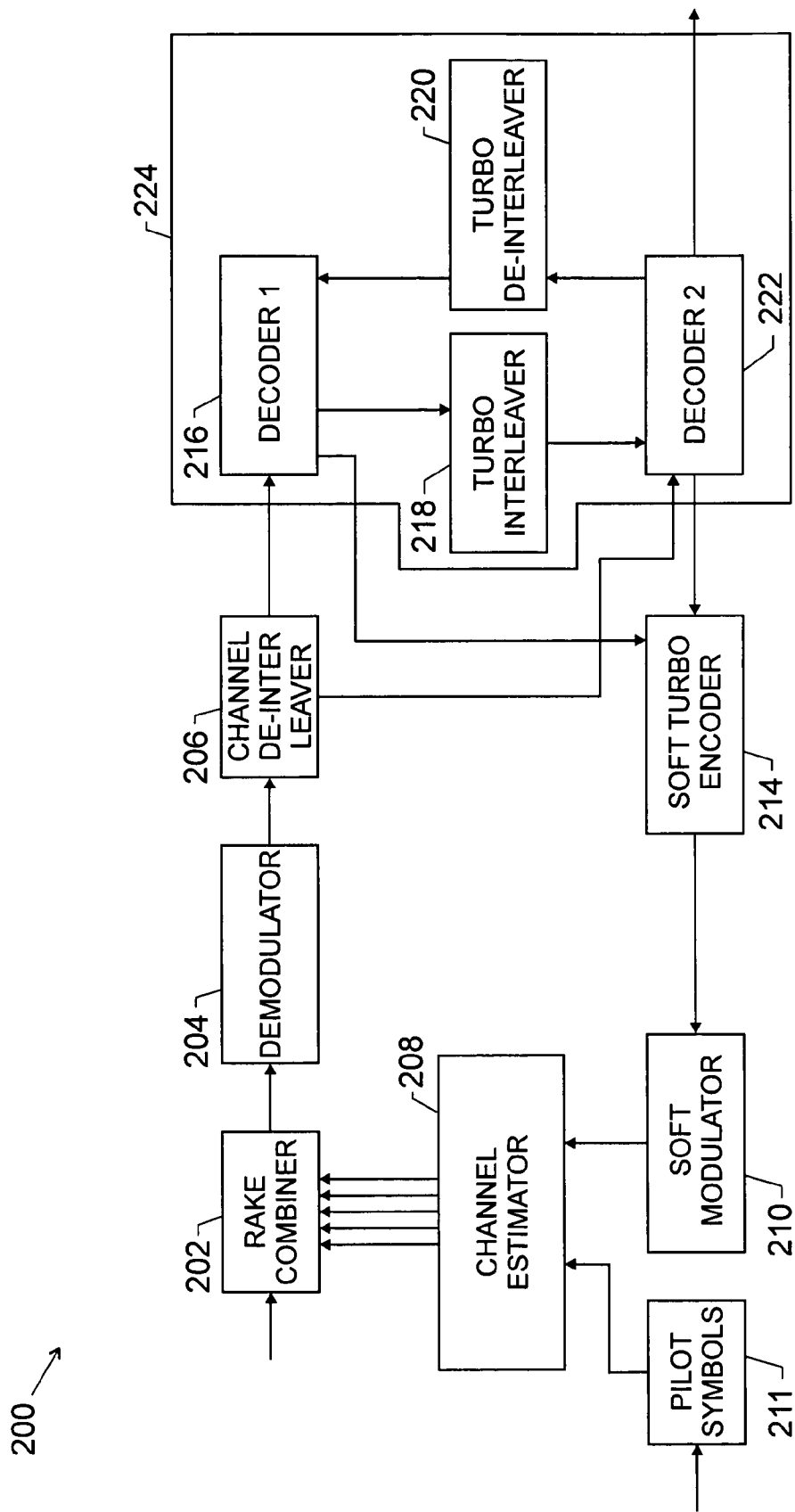
FIG. 5 illustrates a receiver employing iterative channel estimation before the RAKE combiner in accordance with an exemplary embodiment of the present invention.

While the one-shot estimation used in the conventional receiver 400 performs tolerably well, there is much opportunity for improving the accuracy of the channel estimate. One technique for improving the accuracy of the channel estimate is to update the channel estimate based on reliable symbols within the traffic signal. This process, which essentially creates a group of reliable symbols out of norMAl traffic symbols, can produce a more accurate channel estimate then the one-shot channel estimation employed in the conventional receiver 400. FIG. 5 illustrates a receiver employing iterative channel estimation before the RAKE combiner in accordance with embodiments of the present invention. It is generally referenced by a reference numeral 200. The receiver 200 utilizes iterative channel estimation to refine the channel estimation provided to a RAKE combiner 202. Instead of using one-shot channel estimation, the receiver 200 calculates the LLR of symbols in the traffic signal and if deemed reliable, uses the reliable symbols to calculate the channel estimation. This channel estimate is then passed on to RAKE combiner 202. Specifically, the output of a turbo decoder 224 after each decoding iteration essentially acts like a second pilot signal for a channel estimator 208. In effect, this provides a feedback path for the traffic signal in which reliable sections of the traffic signal itself are fed back to refine the channel estimate for the traffic signal.

Similar to the conventional receiver 130 depicted in FIG. 4, the receiver 200 routes the traffic signal to the RAKE combiner 202. The RAKE combiner 202 functions similarly to the RAKE combiner 132 described above and receives the traffic signal and a channel estimate for each RAKE finger. The RAKE combiner 202 uses this channel estimate to compute a correlation for each finger and then delays, scales, and sums the direct and indirect signals.

From the RAKE combiner 202, the RAKE-combined traffic signal passes to a demodulator 204 and a channel de-interleaver 206. In one embodiment, these two components function similarly to their counterparts described above with regard to the conventional receiver 130 depicted in FIG. 4. After passing through the channel de-interleaver 206, the traffic signal passes to the turbo decoder 224.

Unlike the conventional receiver 130, the receiver 200 can use the LLRs generated by the turbo decoder 224 to identify additional reliable symbols for the channel estimator 208 to use in generating the channel estimate. However, as described above, the typically turbo decoder only refines the LLR of the systematic bits, not the LLR of all bits in the traffic signal. For this reason, the majority of the LLRs for the parity bits will never meet the threshold for the parity bit to be deemed reliable. Because the parity bits may encompass a large percentage of the total bits for a given traffic signal, it can be difficult to establish a large enough number of "reliable" symbols to significantly increase the accuracy of the channel estimation using only the systematic bits in the traffic signal.

To address this issue, in one embodiment of this invention, the receiver 200 includes a soft turbo encoder 214 that calculates the LLR of the parity bits based on the the refined LLRs of the systematic bits that were computed by the turbo decoder 224. This calculation is possible because the parity bits were created based on the systematic bits. Specifically, as described above, the encoding process within the turbo encoder 100 can be represented as a table comprising the input bit b, the current state s, the output bits, and the new state. Because this table is known, its values can be employed by the soft turbo decoder 214 to calculate an LLR for each of the parity bits based on the LLRs of the systematic bits calculated by the turbo decoder 224.

Accordingly, the soft turbo encoder 214 can calculate the LLR for the parity bits at time k with the following mathematically formula:

$$L_o^k = \log \left[ \frac{\sum_{(s_k,b) \in (S_1,B)} p_k(s) f_k(b)}{\sum_{(s_k,b) \in \overline{(S_1,B)}} p_k(s) f_k(b)} \right]$$

where at time k $L_o^k$ is the LLR of the parity bit, $\Sigma_{(s_k,b) \in (S_1,B)} p_k(s) f_k(b)$ is the probability that the parity bit is 1, and $\Sigma_{(s_k,b) \in \overline{(S_1,B)}} p_k(s) f_k(b)$ is the probability that the parity bit is zero.

More specifically, in the formula above, s is a variable that represents the current state. The probability $p_k(s)$ denotes the probability that the current state at time k is actually is s; the probability $p_k(s)$ is described in greater detail below. $(S_1,B)$ denotes the set of pairs of current state s and input bit b such the output (parity) bits is 1 (i.e. those rows encoder table where the output bits are 1), and $\overline{(S_1,B)}$ similarly denotes the set of pairs that are not in $(S_1, B)$ (i.e. when the output (parity) bits are 0). Lastly, $f_k(b)$ is a function that is given by:

$$f_k(b) = \left\{ \begin{array}{l} 1/[1 + \exp(-L_i^k)], \text{ if } b = 1 \\ 1/[1 + \exp(L_i^k)], \text{ if } b = 0 \end{array} \right\}$$

where $L_i^k$ denotes the LLR of the systematic bit that is provided by the turbo decoder 224.

Because the current state s actually used during the encoding is not typically known, the soft turbo encoder 214 works with the probability that the state s is a particular state rather than with an actual current state value. This probability, which is known as $p_k(s)$, was mentioned above. The probability $p_k(s)$ of a particular state at time k+1 may be represented mathematically by:

$$p_{k+1}(s) = p_k(g_1(s)) f_k(b) + p_k(g_o(s))$$

where $g_j(s)$ is a function that provides the new state based on the current state s when input bit is j and $f_k(b)$ is a function as described above. An optional norMAlization step could be carried out to make $p_k(s)$ sum to 1 over all s.

In an alternative embodiment of the invention, the LLR for the parity bits are refined in the turbo decoder 224. In this embodiment, the BCJR algorithm in the turbo decoder 224 is modified to output the LLR for both systematic and parity bits. This turbo decoder modification is known to those of ordinary skill in art and is explained in the 1999 article *Pilot Symbol Assisted QAM with Iterative Filtering and Turbo Decoding over Raleigh Flat-Fading Channels* by Yingjiu Xu, Hsuan-Jung Su, and Evaggelos Geraniotis and the 2001 article *Iterative Channel Estimation and Decoding of Pilot Symbol Assisted Turbo Codes Over Flat-Fading Channels* by M. C. Valenti and B. D. Woerner. It should be noted that in this embodiment of the invention, the soft turbo encoder 214 depicted in FIG. 5 is not included in the receiver 200.

Returning now to FIG. 5, the LLRs for the systematic and parity bits may be given to a soft modulator 210. The soft modulator 210 determines the probability for a particular symbol based on the probabilities of the bits that make up the symbol. If the probability for each bit within a particular symbol exceeds a pre-determined threshold, the soft modulator deems the symbol reliable and feeds the symbol into the channel estimator 208 where it serves as an additional pilot symbol during the calculation of the channel estimate. For instance, a symbol may be comprised of two bits, with a reliability threshold is 97% or better. The reliability threshold of 97% or better means that if the LLR is above $$\log\left(\frac{0.97}{0.03}\right)$$

or 1.5097, a bit is deemed to reliably be a one, and if the LLR is below $$\log\left(\frac{0.03}{0.97}\right)$$

or −1.5097, a bit is deemed to reliably be a zero. Thus, if there is a 99% probability that the first bit is zero, the LLR for the first bit is $$\log\left(\frac{0.01}{0.99}\right)$$

or −1.9956. Similarly, if there is a 98% probability that the second bit is one, the LLR for the second bit is $$\log\left(\frac{0.98}{0.02}\right)$$

or 1.6902. Because the LLR for the first bit is below −1.5097 and the LLR for the second bit is above 1.5097, the symbol 01 is deemed to be reliable because both of its bits are deemed to be reliable. If on the other hand, the LLR for the second bit had only an 80% chance of being a one, its LLR would be equal to $$\log\left(\frac{0.8}{0.2}\right)$$

or 0.602, which is well below the 1.5097 reliability threshold chosen for this example. Thus, in this case, the symbol would not be deemed reliable because one of its two bits was not reliable enough.

In another embodiment, one could determine the reliability of a symbol from the probabilities of the bits that comprise that symbol. If the ratio of the maximum of the probabilities to the second maximum of the probabilities exceeds a certain threshold, then one can deem that the symbol is reliable.

The process described above continues with each iteration of the turbo decoder 224. Thus, with each iteration of the turbo decoder 224, the accuracy of the channel estimate can increase because the number of reliable bits (and thus the number of reliable symbols) can increase with each iteration of the turbo decoder 224. A more accurate channel estimation may in turn improve the operation of the RAKE combiner 202, which in turn gives better quality input to the Turbo decoder, which improves the quality of the output from the receiver 200.

In order to update the channel estimate for each of the RAKE fingers, the channel estimator 208 typically needs to store the channel estimate for each of the RAKE fingers that was calculated in the previous iteration. One method of storing the previously calculated channel estimates is with memory located either in the channel estimator 208 or elsewhere in the receiver 200. In another embodiment of the invention, however, it is possible to increase the accuracy of the channel estimate without the need for this additional memory by updating the channel estimate after the RAKE combiner and then refining the RAKE-combined traffic signal based on the updated channel estimate.

Figure 6:
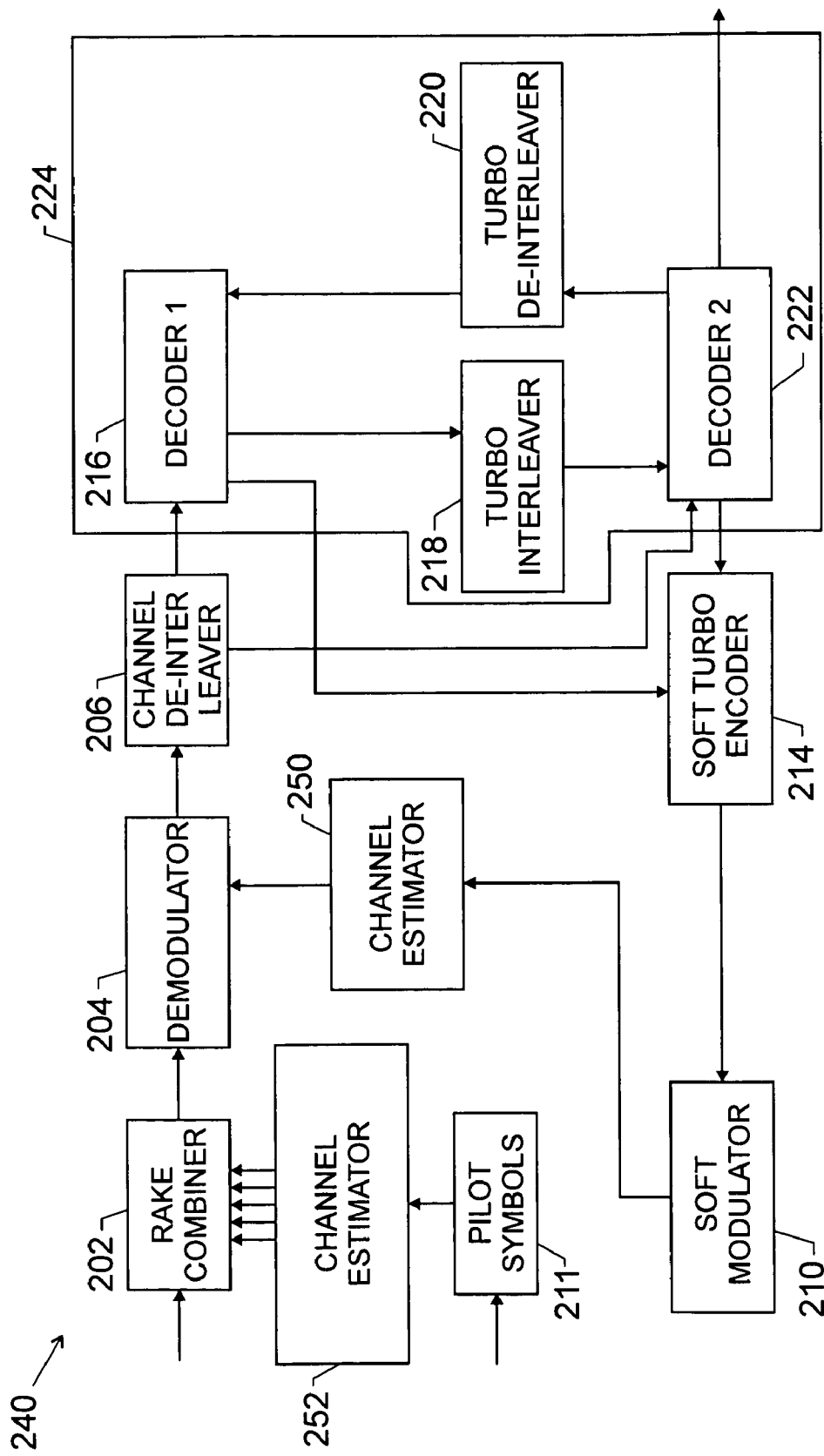
FIG. 6 illustrates a receiver employing iterative channel estimation after the RAKE combiner in accordance with an exemplary embodiment of the present invention.

Turning now to FIG. 6, a receiver employing iterative channel estimation after the RAKE combiner in accordance with embodiments of the present invention is illustrated and generally referenced by a reference numeral 240. For simplicity, like reference numerals have been used to designate those features previously described in regard to FIG. 5. Instead of increasing the accuracy of the channel estimate for each of the RAKE fingers as described in relation to the receiver 200, the receiver 240 employs iterative channel estimation to refine the channel estimate after RAKE combination in the demodulator 204. It is important to note that if the perfect channel estimates were available to the RAKE combiner then one would not resort to the second channel estimation after the RAKE combiner. However, due to imperfect channel estimates, there is a residual effect on the channel that lingers on after the RAKE combiner.

In order to accomplish this, the receiver 240 includes a second channel estimator 250 that calculates a channel estimate for the RAKE-combined traffic signal based solely on reliable symbols outputted from the soft modulator 210. Because an iterative channel estimate is not performed for each RAKE finger, the channel estimator 250 does not need to store channel estimates for each RAKE finger. For this reason, it typically has less memory than the channel estimator 208 shown depicted in FIG. 5 and thus may be less expensive to produce.

As will be shown below in regard to FIG. 7, the receiver 240 can provide a significant improvement over the conventional receiver 130 with only a modest increase in the amount of memory. It is important to note that since the receiver 240 updates the channel after RAKE combination, the channel estimates for each RAKE finger are provided by a channel estimator 252 that works similarly to the channel estimator 131, which was depicted in FIG. 4, and only performs one-shot channel estimation based on pilot symbols 211.

There are many possible advantages in the design of the receiver 200 and the receiver 240. First, because the receivers 200 and 240 perform a more accurate channel estimate, they can provide the same Frame Error Rate ("FER") as a conventional receiver with a traffic signal transmitted at a lower power.

Figure 7:
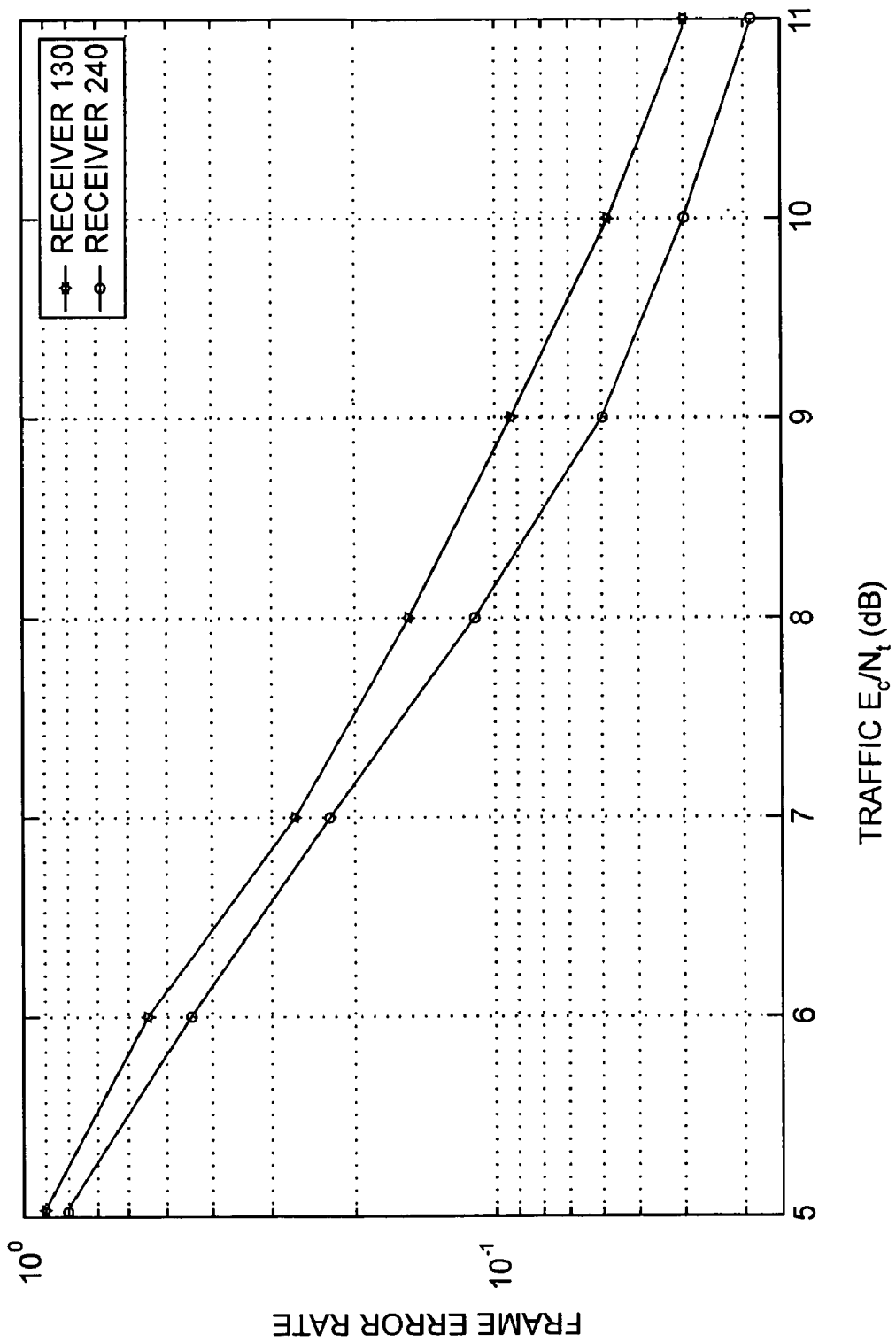
FIG. 7 illustrates a chart depicting simulated performance data for a receiver employing iterative channel estimation after the RAKE combiner in accordance with an exemplary embodiment of the present invention.

For example, FIG. 7 illustrates a chart depicting simulated performance data for a receiver employing iterative channel estimation after the RAKE combiner in accordance with embodiments of the present invention. As FIG. 7 shows, the receiver 240 has a 1 dB performance improvement over the conventional receiver 130 at a 4% FER (0.04). FIG. 7 depicts the FER versus $E_{c,traffic}/N_t$ for the conventional receiver 130 and the receiver 240 using Strawman Channel Model B for 1.2288 Mbps with Quadrature Phase Shift Keying ("QPSK") modulation and $E_{cpilot}N_t=-20$ dB. Strawman Channel Model B is one of the industry accepted standard method for simulating an over the air broadcast. $E_{c,traffic}/N_t$ and $E_{c,pilot}/N_t$ are the ratios of traffic chip energy to noise and pilot chip energy to noise. They are an industry accepted method of measuring the signal to noise ratio of the traffic and the pilot signals. Those skilled in the art will be able to readily convert the traffic chip energy to noise ratio to the signal power to noise ratio. Similarly, while not illustrated in FIG. 7, the receiver 200 may be able to increase performance by over 2.0 dB while maintaining the same FER as the conventional receiver 130.

The performance increase of the receiver 200 and the receiver 240, which was illustrated in FIG. 7, can be applied directly to the transmitters that work with them. For example, a receiver that has a 1 dB performance increase over the conventional receiver 130 will be able to maintain a consistent FER even if the traffic signal strength of the transmitter is reduced by 1 dB. This may permit a receiver direct the transmitters that are communicating with it to reduce the traffic signal power. Specifically, in the case of a cell phone base station operating under the conditions depicted in FIG. 7, the base station may be able to direct the mobile devices communicating with it to reduce their traffic signal power by 20.57% without a loss of call clarity compared to the mobile device operating with a conventional receiver. Reducing the traffic signal power of each traffic signal may reduce the MAI and, as described above, may permit more mobile devices to communicate with the base station on the same frequency.

Another advantage of the receivers 200 and 240 is that they are less reliant on the pilot signal than conventional receivers. For this reason, the receivers 200 and 240 may be able to provide the same FER as a conventional receiver even though the pilot signal is transmitted with less power. Whereas an error or gap due to lower power in the pilot signal could increase the FER of the conventional receiver well past a tolerable level, the receivers 200 and 240 may be able to use the reliable symbols in the traffic signal to maintain an accurate channel estimate even without the pilot signal. Specifically, in the case of a cell phone base station, the base station may be able to direct the mobile devices communicating with it to reduce their pilot signal power without eroding call clarity. As discussed above, reducing the pilot signal power of each pilot signal may reduce the MAI and thus permit more mobile devices to communicate with the base station on the same frequency.

The base functions described above may comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

We claim:

1. A receiver comprising:
a device, having a RAKE combiner, configured to receive a transmitted signal having a pilot portion and non-pilot portion;
a soft turbo encoder configured to calculate a reliability value for at least a portion of the transmitted signal, wherein the calculated reliability value is for a parity bit of the transmitted signal and is calculated based on a reliability value for a plurality of systematic bits of the transmitted signal; and
a channel estimator configured to:
calculate a channel estimate based on the non-pilot portion; and
send the channel estimate to the device.

2. The receiver, as set forth in claim 1, wherein the device comprises:
a soft modulator configured to:
receive the reliability value from the soft turbo encoder;
determine if a portion of the transmitted signal is reliable based on the reliability value; and
send the reliable portion of the transmitted signal to the channel estimator.

3. The receiver, as set forth in claim 2, wherein the soft modulator is configured to determine a probability for a particular symbol based on whether LLRs for the systematic and parity bits exceed a threshold.

4. The receiver, as set forth in claim 2, wherein the soft modulator is configured to calculate the reliability of a symbol of the transmitted signal.

5. The receiver, as set forth in claim 4, wherein the soft modulator is configured to determine if the symbol is reliable by determining if a logarithm likelihood ratio for each bit within the symbol exceeds a predetermined threshold.

6. The receiver, as set forth in claim 1, wherein the device comprises:
a turbo decoder configured to calculate a reliability value for a plurality of systematic and parity bits of the transmitted signal; and
a soft modulator configured to:
receive the reliability value from the turbo decoder;
determine if a portion of the transmitted signal is reliable based on the reliability value; and
send the reliable portion of the transmitted signal to the channel estimator.

7. The receiver, as set forth in claim 6, wherein the turbo decoder is configured to calculate a logarithm likelihood ratio for the plurality of systematic and parity bits of the transmitted signal.

8. The receiver, as set forth in claim 7, wherein the soft modulator is configured to determine if a symbol of the transmitted signal is reliable by determining if the logarithm likelihood ratios for the systematic and parity bits that comprise the symbol exceed a predetermined threshold.

9. The receiver, as set forth in claim 1, wherein the channel estimator is configured to transmit the channel estimate to a RAKE finger in the RAKE combiner.

10. The receiver, as set forth in claim 1, wherein the device comprises a demodulator configured to receive a RAKE-combined signal, and wherein the channel estimator is configured to calculate the channel estimate based on the non-pilot portion of the RAKE-combined signal and to send the channel estimate to the demodulator.

11. The receiver, as set forth in claim 10, wherein the demodulator is configured to demodulate the RAKE-combined signal based on the channel estimate received from the channel estimator.

12. The receiver, as set forth in claim 10, wherein a soft modulator is configured to calculate a reliability value for a parity bit of the transmitted signal based on a reliability value for a systematic bit of the transmitted signal.

13. A method of signal reception comprising:
receiving a transmitted signal having a pilot portion and a non-pilot portion;
calculating a reliability value for the non-pilot portion by calculating a logarithm likelihood ratio for a systematic bit in the non-pilot portion with a turbo decoder, and calculating a logarithm likelihood ratio for a parity bit in the non-pilot portion with a soft turbo encoder;
generating a channel estimate based at least partially on the reliability value; and
sending the channel estimate to a device having a RAKE combiner.

14. The method, as set forth in claim 13, wherein calculating the reliability value comprises calculating a logarithm likelihood ratio for both systematic and parity bits in the non-pilot portion with a turbo decoder.

15. The method, as set forth in claim 13, wherein generating the channel estimate comprises generating the channel estimate based exclusively on the reliability value, wherein the reliability value is calculated based exclusively on the non-pilot portion.

16. The method, as set forth in claim 13, wherein sending the channel estimate to a device comprises sending the channel estimate to one of a plurality of RAKE fingers in the RAKE combiner.

17. The method, as set forth in claim 13, wherein sending the channel estimate to a device comprises sending the channel estimate to a demodulator.

18. The method, as set forth in claim 13, comprising processing the non-pilot portion according to the following equation:

$$L_o^k = \log\left[\frac{\sum_{(s,b)\in(S_1,B)} p_k(s)f_k(b)}{\sum_{(s_k,b)\in(\overline{S_1},B)} p_k(s)f_k(b)}\right].$$

* * * * *

UNITED STATES PATENT AND TRADEMARK OFFICE
CERTIFICATE OF CORRECTION

PATENT NO.       : 7,660,568 B2                                          Page 1 of 1
APPLICATION NO.  : 10/950725
DATED            : February 9, 2010
INVENTOR(S)      : Sharma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1272 days.

Signed and Sealed this

Twenty-eighth Day of December, 2010

David J. Kappos
*Director of the United States Patent and Trademark Office*